US008527835B2

(12) United States Patent
Pepin et al.

(10) Patent No.: US 8,527,835 B2
(45) Date of Patent: Sep. 3, 2013

(54) METHOD FOR SECURE DATA TRANSFER

(75) Inventors: Cyrille Pepin, Andresy (FR); David DeCroix, Montreuil (FR); Guillaume Roudiere, Boulogne (FR)

(73) Assignee: Morpho, Paris (FR)

( * ) Notice: Subject to any disclaimer, the term of this patent is extended or adjusted under 35 U.S.C. 154(b) by 428 days.

(21) Appl. No.: 12/811,132

(22) PCT Filed: Jan. 8, 2009

(86) PCT No.: PCT/FR2009/000014
§ 371 (c)(1),
(2), (4) Date: Jun. 29, 2010

(87) PCT Pub. No.: WO2009/106757
PCT Pub. Date: Sep. 3, 2009

(65) Prior Publication Data
US 2010/0287442 A1    Nov. 11, 2010

(30) Foreign Application Priority Data

Jan. 11, 2008 (FR) ..................... 08 00156

(51) Int. Cl.
*H03M 13/00* (2006.01)
*G06F 11/00* (2006.01)
*G06F 12/14* (2006.01)
*G06F 13/00* (2006.01)
*G11C 29/00* (2006.01)

(52) U.S. Cl.
USPC ............ 714/758; 714/6.24; 714/48; 714/702; 714/709; 714/719; 714/722; 713/189; 713/193; 713/194; 711/103; 711/104

(58) Field of Classification Search
USPC .................. 714/758, 6.24, 48, 709, 702, 719, 714/722; 713/189, 193, 194; 711/103, 104
See application file for complete search history.

(56) References Cited

U.S. PATENT DOCUMENTS 6,971,021 B1 * 11/2005 Daspit et al. .................. 713/192
7,043,643 B1 * 5/2006 Doe et al. ..................... 713/189
(Continued)

FOREIGN PATENT DOCUMENTS

DE      199 25 389 A1    12/2000
DE        19925389    *  12/2000
(Continued)

OTHER PUBLICATIONS

Hagai Bar-El et al., The Sorcerer's Apprentice Guide to Fault Attacks, Internet Citation, XP002329915, Retrieved from Internet: URL:http://web.archive.org/web/20041016071838/eprint.iacr.orq/ 2004/100, retrieved on May 27, 2005. Abstract, pp. 11-12, section "Software countermeasures".

*Primary Examiner* — John J Tabone, Jr.
(74) *Attorney, Agent, or Firm* — Muncy, Geissler, Olds & Lowe, PLLC

(57) ABSTRACT

A method of securely transferring data. The source data stored in a source memory (NV_MEM) is compared with the transferred data (COPY_ELT_X_V_MEM) that has been copied from the source memory (NV_MEM) into a "destination" memory (V_MEM). The method consists in reading from the source memory (NV_MEM) an integrity value (PI_ELT_X) associated with an element (ELEMENT_X_N-V_MEM) such as file containing the source data, in calculating the integrity of a reconstituted element made up of the transferred data (COPY_ELT_X_V_MEM) associated, where appropriate, with the data of the source element (ELEMENT_X_NV_MEM) other than the data that was transferred, and in deciding that the transferred data (COPY_ELT_X_V_MEM) is identical to the source data when the integrity calculation gives a value identical to the integrity value of the source element (PI_ELT_X). The method applies to transferring data between components of a smart card.

4 Claims, 1 Drawing Sheet

(56) References Cited

U.S. PATENT DOCUMENTS

| | | | |
|---|---|---|---|
| 7,069,447 B1* | 6/2006 | Corder | 713/189 |
| 7,372,290 B2* | 5/2008 | Fruhauf et al. | 326/8 |
| 7,941,661 B2* | 5/2011 | Walmsley et al. | 713/166 |
| 7,992,009 B2* | 8/2011 | Seo | 713/187 |
| 8,265,282 B2* | 9/2012 | Alessio et al. | 380/278 |
| 8,271,802 B2* | 9/2012 | Orsini et al. | 713/189 |
| 8,375,253 B2* | 2/2013 | Benoit | 714/38.1 |
| 2005/0138046 A1* | 6/2005 | Miettinen et al. | 707/100 |
| 2006/0129848 A1* | 6/2006 | Paksoy et al. | 713/193 |
| 2007/0014397 A1* | 1/2007 | Ukeda et al. | 380/30 |
| 2007/0288765 A1* | 12/2007 | Kean | 713/193 |
| 2008/0034440 A1* | 2/2008 | Holtzman et al. | 726/27 |
| 2008/0091956 A1* | 4/2008 | Everett et al. | 713/194 |
| 2008/0091957 A1* | 4/2008 | Everett et al. | 713/194 |
| 2008/0133935 A1* | 6/2008 | Elovici et al. | 713/193 |
| 2008/0140915 A1* | 6/2008 | Ju et al. | 711/103 |
| 2010/0031064 A1* | 2/2010 | Walmsley | 713/194 |
| 2010/0077214 A1* | 3/2010 | Jogand-Coulomb et al. | 713/170 |
| 2010/0077225 A1* | 3/2010 | Salgado et al. | 713/189 |
| 2010/0250971 A1* | 9/2010 | Walmsley | 713/194 |

FOREIGN PATENT DOCUMENTS

| | | |
|---|---|---|
| EP | 0 886 202 A | 12/1998 |
| EP | 1 772 811 A | 4/2007 |
| EP | 001772811 A2 * | 4/2007 |
| FR | 2 888 960 A | 1/2007 |
| FR | 2888960 A * | 1/2007 |

* cited by examiner

METHOD FOR SECURE DATA TRANSFER

BACKGROUND OF THE INVENTION

The chip of a smart card typically contains a processor or microcontroller together with a volatile memory such as a random access memory (RAM), and a non-volatile memory such as a flash memory, an electrically erasable programmable read-only memory (EEPROM), or indeed a read-only memory (ROM).

The execution of an operation by software in the smart card requires numerous exchanges of data from the non-volatile memory to the volatile memory of the chip. Thus, any use that is made of data stored in the non-volatile memory requires a transfer to the volatile memory.

This applies when reading a file that might in particular contain data associated with a secret code in order to compare it with a value that is provided via an input, and when reading a key in order to perform a cryptographic calculation.

This also applies when reading a static table of constants stored in ROM, e.g. containing data representative of access rights to files recorded in the card.

This transfer stage, which takes place via a data bus in the chip, is sensitive to disturbances of an electromagnetic kind. There thus exists a fraudulent technique that consists in subjecting the card to a source of electromagnetic radiation while it is transferring data, thus enabling the fraudulent person to access data that should normally remain hidden.

By way of example, such disturbances may cause data to be modified while it is being transferred, in which case the data loaded into the volatile memory differs from the source data in the non-volatile memory.

This sensitivity offers the potential of fraudulently recovering a key or a secret code of the card, of bypassing access rights to files contained in the card, and/or of modifying configuration parameters of the card.

That is why measures are provided to detect such modifications in order to prevent an operation being executed in the event of such a modification being detected.

One method consists in verifying, after transfer, that the data as transferred is identical to the source data. The data may comprise some or all of an element, i.e. some or all of the data constituting one or more files.

Specifically, after transfer, it is verified that each byte of the element written in the volatile memory is identical to each byte of the source element, with this corresponding to an operation of the read and verification type.

That known method nevertheless remains ineffective against certain attacks. If an attacker knows how to disturb a transfer so as to modify the data copied into the non-volatile memory, and if the attacker knows how to reproduce the same disturbance during the read and verification operation, then the modification may pass undetected.

Under such circumstances, the read and verification operation does not detect an anomaly since it verifies only that data previously disturbed during copying was also disturbed during the read operation preceding verification.

OBJECT OF THE INVENTION

The object of the invention is to propose a solution for remedying the above-mentioned drawbacks by proposing a method that provides a better level of security in transferring data between the components of the chip.

SUMMARY OF THE INVENTION

To this end, the invention provides a method of comparing source data stored in a source memory of a smart card with transferred data copied from the source memory into a "destination" memory of the smart card, wherein an integrity value associated with a source element such as a file containing the source data is read from the source memory, wherein the integrity value is calculated for a reconstituted element corresponding to the source element, said element being reconstituted from the transferred data plus, where appropriate, any data in the source element other than the transferred data, and wherein it is decided that the transferred data is identical to the source data when the integrity calculation gives a value that is identical to the integrity value of the source element.

During copying, it is the source data that travels via the data bus, however during verification, it is the integrity value that travels via the data bus. The values traveling via the bus are therefore not the same during copying and during verification, such that an attack that consists in applying the same disturbances to the data bus during copying and during verification is completely ineffective.

The invention also provides a method as defined above, wherein the integrity value of the element containing the source data and the integrity value calculated for the reconstituted element are cyclic redundancy check values for the data.

The invention also provides a method as defined above, wherein a reference value distinct from the data for transfer is copied from the non-volatile memory to the volatile memory, said reference value being firstly pre-stored in the non-volatile memory and secondly pre-stored in read software of the smart card, and wherein the transferred value in the volatile memory is compared with the value stored in the read software to determine whether the transferred data is identical to the source data.

The invention also provides a method as defined above, wherein the reference value is copied while copying the source data.

DETAILED DESCRIPTION OF THE INVENTION

The idea on which the invention is based is to proceed, after transfer, with a calculation concerning the integrity of the transferred data, in such a manner as to detect that a modification has occurred during transfer in the event that the value given by the integrity calculation based on the transferred data does not correspond to the integrity value associated with the source data.

The method applies to transferring some or all of the data from an element having its integrity value stored in source memory.

By way of example, the integrity value is a check sum of the data of the element under consideration, which element is generally a file. This integrity value may be of the longitudinal redundancy check (LRC) type, involving a cross-parity check, or it may be of the hash type.

This integrity value is advantageously a cyclic redundancy check (CRC) value, i.e. an integrity test that is specifically designed for detecting errors in data transmission. It may be constituted by a CRC16 value corresponding to a cyclic redundancy check on 16 binary flags.

Figure 1:
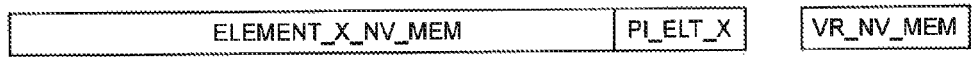
FIG. 1 is a diagrammatic representation of a source element stored in a non-volatile source memory.

In the example below, the method comprises three steps for transferring data from a source element present in non-volatile memory, represented diagrammatically in FIG. 1 where it is referenced ELEMENT_X_NV_MEM, and for verifying that the data as transferred is identical with the source data.

The integrity value PI_ELT_X for the entire element ELEMENT_X_NV_MEM is previously stored in the non-volatile memory, with this being done for example when this element was initially written into the non-volatile memory NV_MEM.

Figure 2:
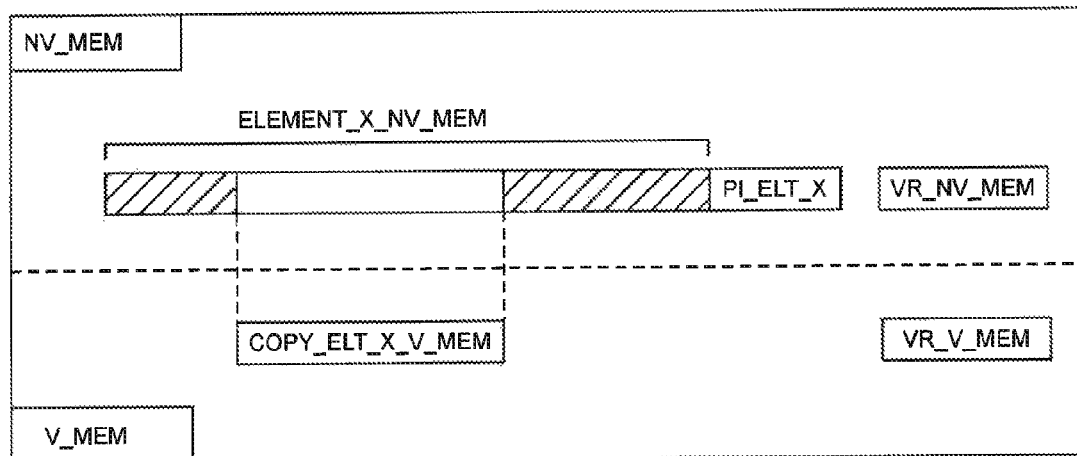
FIG. 2 is a diagrammatic representation of transferring a portion of the data from the source element of FIG. 1 to a volatile memory.
Figure 3:
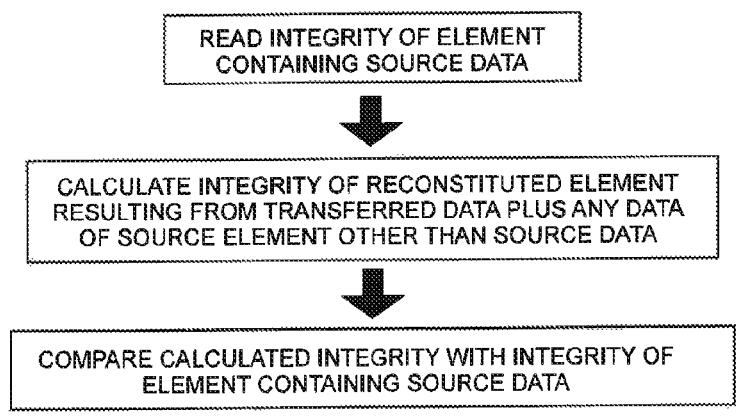
FIG. 3 is a flow chart representing the steps of the method according to the invention.

As shown diagrammatically in FIG. 2, some or all of the data in this source element ELEMENT_X_NV_MEM is initially copied from the non-volatile memory NV_MEM to the volatile VM_MEM. The data written in the destination memory, i.e. in the volatile memory, is referenced COPY_ELT_X_V_MEM.

Advantageously, correct copying of this data COPY_ELT_X_V_MEM is verified by comparing each copy byte with each corresponding byte in the source element ELEMENT_X_NV_MEM, thus constituting a read and verification operation.

The verification may be performed when a portion of the data has been transferred, in order to stop transfer before all of the data has been written in the volatile memory.

In a last stage, the integrity of the transferred data is verified. If it is all of the data in the source element ELEMENT_X_NV_MEM that has been written in the volatile memory, then this verification consists in calculating the integrity of the data written in the volatile memory, and in comparing the integrity value given by said calculation with the integrity value PI_ELT_X written in the non-volatile memory NV_MEM.

If the transferred data COPY_ELT_X_V_MEM corresponds to only some of the data constituting the element ELEMENT_X_NV_MEM, then the integrity is calculated of a reconstituted element. This element is reconstituted on the basis of the transferred data COPY_ELT_X_V_MEM having added thereto data that was not transferred from the element ELEMENT_X_NV_MEM, i.e. the shaded portions in FIG. 2.

This reconstituted element corresponds to the memory element ELEMENT_X_NV_MEM but comprising the transferred data COPY_ELT_X_V_MEM as written in the volatile memory V_MEM in association with the non-transferred data as written in the non-volatile memory NV_MEM.

When the data transfer has taken place normally, the source data written in the non-volatile memory NV_MEM is identical to the transferred data written in the volatile memory V_MEM.

Consequently, under normal circumstances, i.e. when the data is transferred without being modified, the integrity for the reconstituted element is identical to the integrity PI_ELT_X for the memory element ELEMENT_X_N-V_MEM as written in the non-volatile memory.

In contrast, when the data has been modified during transfer, i.e. while it was being copied, the integrity calculated for the reconstituted element gives a value that differs from PI_ELT_X, thus making it possible to detect this anomaly or modification.

As mentioned above, the read and verification step is optional, insofar as it is not effective against a disturbance applied to the transfer bus identically during copying and during the read and verification operation. Nevertheless, this step makes it possible to detect as early as possible any brief disturbance to which the data bus might be subjected, so as to stop the process as early as possible in the event of an anomaly.

The method of the invention thus makes it possible to detect a disturbance applied to the data bus: since it includes verification by an integrity check, the data transferred for this verification, i.e. the value PI_ELT_X is not the same as the data transferred for copying. An attack that consists in applying the same disturbances to the bus during copying and during verification is therefore completely ineffective.

The method may also be associated with a "false read" operation performed during the copying of the source data from the non-volatile memory NV_MEM to the volatile memory V_MEM. Under such circumstances, a predetermined reference value, written VR_NV_MEM, is provided that is pre-stored in the non-volatile memory throughout the lifetime of the card, and that is also incorporated in the code of the card's reader program. This value corresponds for example to one data byte.

Prior to making the copy, a rank, written i, is determined randomly for the false read.

The copying operation is then launched, beginning with the initial bytes from the source data ELEMENT_X_NV_MEM that are transferred one after another to the volatile memory.

However, the $i^{th}$ byte to be transferred is the "false read" byte, i.e. the byte corresponding to the reference value VR_N-V_MEM. Once this byte has been transferred, copying continues as normal, transferring successively the $i^{th}$ byte from the source data ELEMENT_X_NV_MEM, and then the following bytes.

Once the false read byte has been written in the volatile memory VR_V_MEM, it may be compared with the value that is incorporated in the card's read program, which value is necessarily identical to VR_NV_MEM. This makes it possible to detect certain disturbances that might occur during transfer.

This additional mechanism enables certain types of disturbance to be detected sooner than they would have been detected by the integrity check. Indeed, by means of this mechanism, disturbances can be detected before the end of data being copied into the volatile memory, with this consequently being more reliable since the transfer may be stopped immediately, i.e. before reaching the end of data copying to the volatile memory.

It should also be observed that in the above-described example, the optional read and comparison step takes place before the step of checking the integrity of the transferred data. However this optional step may also be implemented after the step of checking the integrity, insofar as it makes it possible, under certain circumstances, to detect errors that are not detected by the integrity value.

The invention provides various advantages since it makes it possible to combat effectively an attack by disturbing the data bus, and it is inexpensive in terms of execution time. Finally, it does not require additional data to be stored in the memory(ies) of the smart card.

What is claimed is:

1. A method of comparing source data and transferred data in a smart card comprising a source memory (NV_MEM) containing the source data and a destination memory (V_MEM) containing the transferred data, the method comprising:

reading from the source memory (NV_MEM) a first integrity value (PI_ELT_X) associated to a source element (ELEMENT_X_NV_MEM) containing the source data;

calculating a second integrity value for a reconstituted element reconstituted from the transferred data (COPY_ELT_X_V_MEM) plus any data in the source element (ELEMENT_X_NV_MEM) other than the transferred data if the transferred data (COPY_ELT_X_V_MEM) corresponds to only some of the data constituting the source element (ELEMENT_X_NV_MEM); and concluding that the transferred data (COPY_ELT_X_V_MEM) and the source data are identical when the first and the second integrity values are identical.

2. The method according to claim 1, wherein the first integrity value (PI_ELT_X) of the source element containing the source data and the second integrity value calculated for the reconstituted element are cyclic redundancy check values.

3. The method according to claim 1, wherein a reference value (VR_NV_MEM) distinct from the transferred data is copied from the source memory (NV_MEM) to the destination memory (V_MEM), said reference value being firstly pre-stored in the source memory (NV_MEM) and secondly pre-stored in a read software of the smart card, and wherein the transferred value (VR_V_MEM) in the destination memory (V_MEM) is compared with the reference value stored in the read software to determine whether the transferred data (COPY_ELT_X_V_MEM) is identical to the source data.

4. The method according to claim 3, wherein the reference value (VR_NV_MEM) is copied while copying the source data.

* * * * *